United States Patent
Tao et al.

(10) Patent No.: US 11,608,402 B2
(45) Date of Patent: Mar. 21, 2023

(54) GRAFT COPOLYMER, THERMOPLASTIC RESIN COMPOSITION, AND MOLDED ARTICLE PRODUCED BY MOLDING THE SAME

(71) Applicant: TECHNO-UMG CO., LTD., Tokyo (JP)

(72) Inventors: Kousaku Tao, Ube (JP); Yoshitaka Naitoh, Ube (JP); Yuuki Taguchi, Ube (JP)

(73) Assignee: TECHNO-UMG CO., LTD., Tokyo (JP)

( * ) Notice: Subject to any disclaimer, the term of this patent is extended or adjusted under 35 U.S.C. 154(b) by 194 days.

(21) Appl. No.: 17/268,812

(22) PCT Filed: Oct. 11, 2019

(86) PCT No.: PCT/JP2019/040238
§ 371 (c)(1),
(2) Date: Feb. 16, 2021

(87) PCT Pub. No.: WO2020/095622
PCT Pub. Date: May 14, 2020

(65) Prior Publication Data
US 2021/0340298 A1    Nov. 4, 2021

(30) Foreign Application Priority Data

Nov. 5, 2018  (JP) .............................. JP2018-208252
Nov. 5, 2018  (JP) .............................. JP2018-208253

(51) Int. Cl.
*C08F 265/06*  (2006.01)
*C08L 33/12*   (2006.01)

(52) U.S. Cl.
CPC ............ *C08F 265/06* (2013.01); *C08L 33/12* (2013.01); *C08L 2203/30* (2013.01)

(58) Field of Classification Search
CPC .......... C08F 220/1806; C08F 220/1807; C08F 265/06; C08F 220/301
See application file for complete search history.

(56) References Cited

U.S. PATENT DOCUMENTS

| | | | |
|---|---|---|---|
| 3,988,392 A | 10/1976 | Kameda et al. | |
| 5,512,631 A | 4/1996 | Jalbert et al. | |
| 8,278,388 B2 | 10/2012 | Hongo et al. | |
| 8,642,699 B2 | 2/2014 | Matsuoka et al. | |
| 11,214,644 B2 | 1/2022 | Iwanaga et al. | |
| 2017/0137620 A1 | 5/2017 | Iwanaga et al. | |
| 2019/0031845 A1 | 1/2019 | Kitayama et al. | |

FOREIGN PATENT DOCUMENTS

| | | | |
|---|---|---|---|
| CN | 106795355 A | | 5/2017 |
| CN | 108602929 A | | 9/2018 |
| JP | H06-184235 A | | 7/1994 |
| JP | 2001-316424 A | | 11/2001 |
| JP | 2006-299038 A | | 11/2006 |
| JP | 2009-203348 A | | 9/2009 |
| JP | 2009-215398 A | | 9/2009 |
| JP | 2009203348 | * | 9/2009 |
| JP | 2017-88774 A | | 5/2017 |
| JP | 2019-099698 A | | 6/2019 |
| WO | 2009/096374 A1 | | 8/2009 |
| WO | 2009/113573 A1 | | 9/2009 |
| WO | 2017/171008 A1 | | 10/2017 |

OTHER PUBLICATIONS

European Patent Office, "Extended European Search Report with Search Opinion for European Patent Application No. 19881985.6," dated Jun. 23, 2022.
PCT/ISA/210, "International Search Report for International Application No. PCT/JP2019/040238," dated Dec. 24, 2019.
China National Intellectual Property Administration, "Office Action and Seach Report for Chinese Patent Application 201980049758.5," dated Dec. 2, 2022.
Japan Patent Office, "Office Action for Japanese Patent Application No. 2018-208252," dated Dec. 6, 2022.

* cited by examiner

*Primary Examiner* — Mark S Kaucher
(74) *Attorney, Agent, or Firm* — Manabu Kanesaka

(57) ABSTRACT

A graft copolymer (B) produced by graft polymerization of a vinyl monomer mixture (m1) including an alkyl (meth) acrylate ester onto a copolymer (A), the copolymer (A) being a copolymer of an alkyl (meth)acrylate ester (Aa) and a (meth)acrylate ester (Ab) including an aromatic hydrocarbon group. A thermoplastic resin composition including the graft copolymer (B), a copolymer (C) that is the product of a polymerization reaction of a vinyl monomer mixture (m2) including an alkyl (meth)acrylate ester, and a molded article produced by molding the thermoplastic resin composition. Provided are the graft copolymer with which a thermoplastic resin composition excellent in terms of transparency, impact resistance, weather resistance, and flowability may be produced, a thermoplastic resin composition including the graft copolymer, and the molded article produced by molding the thermoplastic resin composition.

10 Claims, No Drawings

GRAFT COPOLYMER, THERMOPLASTIC RESIN COMPOSITION, AND MOLDED ARTICLE PRODUCED BY MOLDING THE SAME

TECHNICAL FIELD

The present invention relates to a graft copolymer with which a thermoplastic resin composition excellent in terms of transparency, impact resistance, weather resistance, and flowability may be produced, a thermoplastic resin composition including the graft copolymer, and a molded article produced by molding the thermoplastic resin composition.

BACKGROUND ART

It is markedly advantageous from an industrial viewpoint to enhance the impact resistance of resin materials in order to, for example, widen the range of application of the resin materials and enable reductions in the thicknesses of molded articles and increases in the sizes of molded articles. There have been proposed various methods for enhancing the impact resistance of resin materials. Among those methods, a method in which a rubbery polymer is used in combination with a hard resin material in order to enhance impact resistance while maintaining the characteristics of the hard resin material has been used in the industrial field. Examples of such a material include an acrylonitrile-butadiene-styrene (ABS) resin.

While an ABS resin has excellent impact resistance, it has been difficult to use an ABS resin without any decoration, such as a coating or a film, because the rubber component of the ABS resin, that is, polybutadiene, has low weather resistance.

In order to address the above-described issues of an ABS resin, an acrylonitrile-styrene-acrylate ester (ASA) resin, which includes an acrylic rubber as a rubber component, has been developed and used in the industrial field.

Methacrylate ester resins have been broadly known as hard resins having excellent transparency. However, methacrylate ester resins have low impact resistance and are likely to crack.

As a resin excellent in terms of transparency and impact resistance, PTL 1 discloses a method in which a methacrylate ester resin is used as a hard resin and an ASA resin and an ABS resin are added to the methacrylate ester resin.

While the method described in PTL 1 offers excellent impact resistance, a sufficiently high degree of transparency fails to be achieved because of the large difference in refractive index between polybutadiene or an acrylic rubber and a methacrylate ester resin. Furthermore, the poor weather resistance of polybutadiene narrows the range of application.

PTL 2 discloses a method in which a polybutadiene/acrylic rubber complex constituted by polybutadiene particles and an acrylic rubber covering the outer sides of the polybutadiene particles is added to a methacrylate ester resin.

The method described in PTL 2 reduces the difference in refractive index between the rubber component and a methacrylate ester resin by the addition of polybutadiene and consequently enhances appearance. However, the addition of polybutadiene may degrade weather resistance.

PTL 3 discloses a method in which butyl acrylate is copolymerized with styrene in order to increase the refractive index of an acrylic rubber.

However, the method described in PTL 3 may significantly degrade impact resistance.

PTL 1: JP 2001-316424 A
PTL 2: JP 2009-215398 A
PTL 3: JP 2017-88774 A

SUMMARY OF INVENTION

An object of the present invention is to provide a graft copolymer with which a thermoplastic resin composition excellent in terms of transparency, impact resistance, weather resistance, and flowability may be produced, a thermoplastic resin composition including the graft copolymer, and a molded article produced by molding the thermoplastic resin composition.

The inventor of the present invention found that a thermoplastic resin composition excellent in terms of transparency, impact resistance, weather resistance, and flowability may be produced with a graft copolymer (B) produced by graft polymerization of a vinyl monomer mixture (m1) including at least an alkyl (meth)acrylate ester as an essential component in the presence of a copolymer (A) that is a copolymer of an alkyl (meth)acrylate ester (Aa) and a (meth)acrylate ester (Ab) including an aromatic hydrocarbon group.

The present invention has a gist as below:

A graft copolymer (B) produced by graft polymerization of a vinyl monomer mixture (m1) including an alkyl (meth)acrylate ester onto a copolymer (A), the copolymer (A) being a copolymer of an alkyl (meth)acrylate ester (Aa) and a (meth)acrylate ester (Ab) including an aromatic hydrocarbon group.

The graft copolymer (B) according to [1], wherein, relative to 100% by mass of a total content of a unit of the alkyl (meth)acrylate ester (Aa) and a unit of the (meth)acrylate ester (Ab) including an aromatic hydrocarbon group in the copolymer (A), a content of the unit of the alkyl (meth)acrylate ester (Aa) in the copolymer (A) is 55% to 85% by mass and a content of the unit of the (meth)acrylate ester (Ab) including an aromatic hydrocarbon group in the copolymer (A) is 15% to 45% by mass.

The graft copolymer (B) according to [1] or [2], wherein a content of the alkyl (meth)acrylate ester in the vinyl monomer mixture (m1) is 60% to 100% by mass.

A graft copolymer (B) produced by graft polymerization of a vinyl monomer mixture (m1) including an alkyl (meth)acrylate ester, a vinyl cyanide compound, and an aromatic vinyl compound onto a copolymer (A), the copolymer (A) being a copolymer of an alkyl (meth)acrylate ester (Aa) and a (meth)acrylate ester (Ab) including an aromatic hydrocarbon group.

The graft copolymer (B) according to [4], wherein, relative to 100% by mass of a total content of a unit of the alkyl (meth)acrylate ester (Aa) and a unit of the (meth)acrylate ester (Ab) including an aromatic hydrocarbon group in the copolymer (A), a content of the unit of the alkyl (meth)acrylate ester (Aa) in the copolymer (A) is 70% to 90% by mass and a content of the unit of the (meth)acrylate ester (Ab) including an aromatic hydrocarbon group in the copolymer (A) is 10% to 30% by mass.

The graft copolymer (B) according to [4] or [5], wherein a content of the alkyl (meth)acrylate ester in the vinyl monomer mixture (m1) is 10% to 30% by mass, a content of the vinyl cyanide compound in the vinyl monomer mixture (m1) is 10% to 30% by mass, and a content of the aromatic vinyl compound in the vinyl monomer mixture (m1) is 50% to 70% by mass.

The graft copolymer (B) according to any one of [1] to [6], wherein the copolymer (A) includes a unit of the alkyl (meth)acrylate ester (Aa), a unit of the (meth)acrylate ester (Ab) including an aromatic hydrocarbon group, and a unit derived from a crosslinking agent and/or a unit derived from a graft-crossing agent.

The graft copolymer (B) according to [7], wherein a content of the unit derived from a crosslinking agent and/or a graft-crossing agent in the copolymer (A) is 0.1% to 3% by mass, relative to 100% by mass of a total content of the unit of the alkyl (meth)acrylate ester (Aa), the unit of the (meth)acrylate ester (Ab) including an aromatic hydrocarbon group, and the unit derived from a crosslinking agent and/or a graft-crossing agent.

The graft copolymer (B) according to [7] or [8], wherein the copolymer (A) is produced by miniemulsion polymerization of a mixture including the alkyl (meth)acrylate ester (Aa), the (meth)acrylate ester (Ab) including an aromatic hydrocarbon group, a crosslinking agent and/or a graft-crossing agent, a hydrophobic substance, and an initiator.

The graft copolymer (B) according to any one of [1] to [9], wherein the copolymer (A) has a volume-average particle size of 0.05 to 0.80 μm and a degree of swelling of 2 to 15 times.

The graft copolymer (B) according to any one of [1] to [10], wherein, relative to 100% by mass of a total content of the copolymer (A) and the vinyl monomer mixture (m1), a content of the copolymer (A) is 50% to 80% by mass and a content of the vinyl monomer mixture (m1) is 20% to 50% by mass, and the graft copolymer (B) has a graft ratio of 25% to 100%.

A thermoplastic resin composition comprising the graft copolymer (B) according to any one of [1] to [11].

The thermoplastic resin composition according to [12], further comprising, in addition to the graft copolymer (B), a copolymer (C) that is the product of a polymerization reaction of a vinyl monomer mixture (m2) including an alkyl (meth)acrylate ester.

The thermoplastic resin composition according to [13], wherein the vinyl monomer mixture (m2) includes an alkyl (meth)acrylate ester having the same structure as the alkyl (meth)acrylate ester included in the vinyl monomer mixture (m1), and a content of the alkyl (meth)acrylate ester in the vinyl monomer mixture (m2) is 60% to 100% by mass.

The thermoplastic resin composition according to [13] or [14], wherein, relative to 100% by mass of a total content of the graft copolymer (B) and the copolymer (C), a content of the graft copolymer (B) is 10% to 50% by mass and a content of the copolymer (C) is 50% to 90% by mass.

A molded article produced by molding the thermoplastic resin composition according to any one of [12] to [15].

Advantageous Effects of Invention

According to the present invention, a thermoplastic resin composition excellent in terms of transparency, impact resistance, weather resistance, and flowability and a molded article produced by molding the thermoplastic resin composition may be produced.

An embodiment of the present invention is described below in detail.

The term "(meth)acrylic acid" used herein refers to either or both "acrylic acid" and "methacrylic acid". The same applies to the term "(meth)acrylate".

The term "unit" used herein refers to a structural element derived from a monomeric compound (monomer) present before polymerization. For example, the term "unit of a (meth)acrylate ester" refers to "structural element derived from a (meth)acrylate ester".

The proportion of the unit of each of the monomers constituting a polymer corresponds to the proportion of the monomer in a monomer mixture used for producing the polymer.

Graft Copolymer (B)

The graft copolymer (B) according to the present invention is produced by graft polymerization of a vinyl monomer mixture (m1) including at least an alkyl (meth)acrylate ester as an essential component in the presence of a copolymer (A) (hereinafter, may be referred to as "the copolymer (A) according to the present invention") that is a copolymer of an alkyl (meth)acrylate ester (Aa) and a (meth)acrylate ester (Ab) including an aromatic hydrocarbon group.

Copolymer (A)

The copolymer (A) according to the present invention is a copolymer of an alkyl (meth)acrylate ester (Aa) and a (meth)acrylate ester (Ab) including an aromatic hydrocarbon group.

The alkyl (meth)acrylate ester (Aa) is preferably an alkyl (meth)acrylate ester including an alkyl group having 1 to 12 carbon atoms. Among such alkyl (meth)acrylate esters, n-butyl acrylate, 2-ethylhexyl acrylate, and ethyl acrylate are particularly preferable in order to enhance the impact resistance of the thermoplastic resin composition including the graft copolymer (B). The alkyl (meth)acrylate esters (Aa) may be used alone or in combination of two or more.

The (meth)acrylate ester (Ab) including an aromatic hydrocarbon group may be any (meth)acrylate ester including an aromatic hydrocarbon group, such as a phenyl group or a benzyl group, or a group including such an aromatic hydrocarbon group. Examples thereof include, but are not limited to, an aryl (meth)acrylate ester, an aryloxy (meth)acrylate ester, and an alkyl (meth)acrylate ester including an aryl group, such as a phenyl group, or an aryloxy group, such as a phenoxy group, as a substituent attached to the alkyl ester portion. The (meth)acrylate ester (Ab) including an aromatic hydrocarbon group is particularly preferably benzyl acrylate or 2-phenoxyethyl acrylate in order to enhance the impact resistance of the thermoplastic resin composition including the graft copolymer (B). The (meth)acrylate esters (Ab) including an aromatic hydrocarbon group may be used alone or in combination of two or more.

The contents of the unit of the alkyl (meth)acrylate ester (Aa) and the unit of the (meth)acrylate ester (Ab) including an aromatic hydrocarbon group in the copolymer (A) are preferably set as described below in accordance with the components of the vinyl monomer mixture (m1) in order to enhance the transparency and impact resistance of the thermoplastic resin composition including the graft copolymer (B).

In the case where the vinyl monomer mixture (m1) includes an alkyl (meth)acrylate ester and, preferably, the content of the alkyl (meth)acrylate ester is 60% to 100% by mass:

relative to 100% by mass of the total content of the unit of the alkyl (meth)acrylate ester (Aa) and the unit of the (meth)acrylate ester (Ab) including an aromatic hydrocarbon group, the contents of the unit of the alkyl (meth) acrylate ester (Aa) and the unit of the (meth)acrylate ester (Ab) including an aromatic hydrocarbon group are preferably 55% to 85% by mass and 15% to 45% by mass, respectively, are more preferably 60% to 80% by mass and 20% to 40% by mass, respectively, and are further preferably 65% to 75% by mass and 25% to 35% by mass, respectively. If the content of the alkyl (meth)acrylate ester (Aa) is lower than 55% by mass, transparency and impact resistance may become degraded. If the content of the alkyl (meth)acrylate ester (Aa) is higher than 85% by mass, transparency may become degraded.

In the case where the vinyl monomer mixture (m1) includes an alkyl (meth)acrylate ester, a vinyl cyanide compound, and an aromatic vinyl compound and, preferably, the contents of the alkyl (meth)acrylate ester, the vinyl cyanide compound, and the aromatic vinyl compound are 10% to 30% by mass, 10% to 30% by mass, and 50% to 70% by mass, respectively:

relative to 100% by mass of the total content of the unit of the alkyl (meth)acrylate ester (Aa) and the unit of the (meth)acrylate ester (Ab) including an aromatic hydrocarbon group, the contents of the unit of the alkyl (meth)acrylate ester (Aa) and the unit of the (meth)acrylate ester (Ab) including an aromatic hydrocarbon group are preferably 70% to 90% by mass and 10% to 30% by mass, respectively, are more preferably 72% to 88% by mass and 12% to 28% by mass, respectively, and are further preferably 75% to 85% by mass and 15% to 25% by mass, respectively. If the content of the alkyl (meth)acrylate ester (Aa) is lower than 70% by mass, transparency and impact resistance may become degraded. If the content of the alkyl (meth)acrylate ester (Aa) is higher than 90% by mass, transparency may become degraded.

The contents of the unit of the (meth)acrylate ester (Ab) and the unit of the (meth)acrylate ester (Ab) including an aromatic hydrocarbon group in the copolymer (A) may be determined by heating the copolymer (A), the graft copolymer (B), the thermoplastic resin composition including the graft copolymer (B) and the copolymer (C) described below, or a molded article produced by molding the thermoplastic resin composition at 600° C. to decompose them into monomer units and subsequently conducting a component analysis using a GC-MS apparatus.

As described above, the proportions of the amounts of the alkyl (meth)acrylate ester (Aa) and the (meth)acrylate ester (Ab) including an aromatic hydrocarbon group that are used in the production of the copolymer (A) to the total amount of the alkyl (meth)acrylate ester (Aa) and the (meth)acrylate ester (Ab) including an aromatic hydrocarbon group correspond to the contents of the unit of the alkyl (meth)acrylate ester (Aa) and the unit of the (meth)acrylate ester (Ab) including an aromatic hydrocarbon group in the copolymer (A), respectively.

The copolymer (A) according to the present invention is preferably a copolymer including either or both of a unit derived from a crosslinking agent and a unit derived from a graft-crossing agent in addition to the alkyl (meth)acrylate ester (Aa) and the (meth)acrylate ester (Ab) including an aromatic hydrocarbon group. When the copolymer (A) includes the unit derived from a graft-crossing agent and/or a crosslinking agent, the impact resistance of the thermoplastic resin composition including the graft copolymer (B) may be further enhanced.

Examples of the graft-crossing agent include allyl compounds. Specific examples thereof include allyl methacrylate, triallyl cyanurate, and triallyl isocyanurate. The above graft-crossing agents may be used alone or in a mixture of two or more.

Examples of the crosslinking agent include dimethacrylate compounds. Specific examples thereof include ethylene glycol dimethacrylate, propylene glycol dimethacrylate, 1,3-butylene glycol dimethacrylate, and 1,4-butylene glycol dimethacrylate. The above crosslinking agents may be used alone or in a mixture of two or more.

In the case where the crosslinking agent and/or the graft-crossing agent is used, the content of the unit derived from the crosslinking agent and/or the graft-crossing agent in the copolymer (A) is preferably 0.1% to 3% by mass and is more preferably 0.2% to 2% by mass relative to 100% by mass of the total contents of the unit of the alkyl (meth)acrylate ester (Aa), the unit of the (meth)acrylate ester (Ab) including an aromatic hydrocarbon group, and the unit derived from the crosslinking agent and/or the unit derived from the graft-crossing agent, in order to enhance the impact resistance of the thermoplastic resin composition including the graft copolymer (B).

The copolymer (A) may include a monomer unit other than the unit of the alkyl (meth)acrylate ester (Aa), the unit of the (meth)acrylate ester (Ab) including an aromatic hydrocarbon group, or the unit derived from the crosslinking agent and/or the graft-crossing agent, which is optionally used as needed, such that the object of the present invention is not impaired. Examples of the other monomer unit that may be included in the copolymer (A) include one or more vinyl monomers that are included in the vinyl monomer mixture (m1) described below and that are other than the alkyl (meth)acrylate ester (Aa) or the (meth)acrylate ester (Ab) including an aromatic hydrocarbon group. The content of the other vinyl monomer unit is preferably 20% by mass or less and is particularly preferably 10% by mass or less relative to 100% by mass of the copolymer (A) in order to achieve the advantageous effects of the present invention in an effective manner.

The method for producing the copolymer (A) is not limited; it is preferable to perform emulsion polymerization or miniemulsion polymerization of a mixture including the alkyl (meth)acrylate ester (Aa), the (meth)acrylate ester (Ab) including an aromatic hydrocarbon group, and the crosslinking agent and/or the graft-crossing agent. It is particularly preferable to use a method in which miniemulsion polymerization is performed, in order to enhance the physical properties of the resin composition including the graft copolymer (B).

Examples of the method for producing the copolymer (A) using an emulsion polymerization method include a method in which a radical initiator, the alkyl (meth)acrylate ester (Aa), the (meth)acrylate ester (Ab) including an aromatic hydrocarbon group, and the crosslinking agent and/or the graft-crossing agent are added to an aqueous solvent and copolymerization is performed in the presence of an emulsifier.

The addition of the radical initiator, the alkyl (meth) acrylate ester (Aa), the (meth)acrylate ester (Ab) including an aromatic hydrocarbon group, and the crosslinking agent and/or the graft-crossing agent may be done in one batch, in several batches, or continuously.

Examples of the miniemulsion polymerization method used for producing the copolymer (A) include, but are not limited to, a method including a step of mixing the alkyl (meth)acrylate ester (Aa), the (meth)acrylate ester (Ab) including an aromatic hydrocarbon group, the crosslinking agent and/or the graft-crossing agent, a hydrophobic substance, and an initiator with one another, adding water and an emulsifier to the resulting mixture, and applying a shear force to the mixture to prepare a pre-emulsion (miniemulsion); and a step of heating the mixture to a polymerization-start temperature to perform polymerization.

In the miniemulsion formation step, for example, a shearing step using ultrasonic irradiation is conducted. This causes the monomers to be torn by the shear force to form fine monomer oil droplets covered with the emulsifier. Subsequently, heating is performed to the polymerization-start temperature of the initiator in order to directly polymerize the fine monomer oil droplets. Hereby, polymer microparticles are produced.

Publicly known methods may be used for generating the shear force used for forming the pre-emulsion. Examples of a high-shear apparatus used for forming the pre-emulsion include, but are not limited to, an emulsification apparatus that includes a high-pressure pump and an interaction chamber; and an apparatus that uses ultrasonic energy or high frequency to form a miniemulsion. Examples of the emulsification apparatus that includes a high-pressure pump and an interaction chamber include "Pressure Homogenizer" produced by SPX Corporation APV and "Microfluidizer" produced by Powrex Corporation. Examples of the apparatus that uses ultrasonic energy or high frequency to form a miniemulsion include "Sonic Dismembrator" produced by Fisher Scient and "ULTRASONIC HOMOGENIZER" produced by NIHONSEIKI KAISHA LTD.

In order to enhance workability, stability, productivity, and the like, the amount of the aqueous solvent used for preparing the pre-emulsion is preferably set to about 100 to 500 parts by mass relative to 100 parts by mass of the amount of the mixture excluding water such that the concentration of the solid component in the reaction system after polymerization is about 5% to 50% by mass.

In the production of the rubbery polymer (A) according to the present invention, a hydrophobic substance is preferably used at a predetermined proportion. Using a hydrophobic substance in the preparation of the pre-emulsion may enhance the production consistency of miniemulsion polymerization and enable the production of a rubbery polymer (A) suitable for the present invention.

Examples of the hydrophobic substance include a hydrocarbon having 10 or more carbon atoms, an alcohol having 10 or more carbon atoms, a hydrophobic polymer having a mass-average molecular weight (Mw) of less than 10000, and a hydrophobic monomer, such as a vinyl ester of an alcohol having 10 to 30 carbon atoms, a vinyl ether of an alcohol having 12 to 30 carbon atoms, an alkyl (meth)acrylate having 12 to 30 carbon atoms, a carboxylic acid vinyl ester having 10 to 30 carbon atoms (preferably having 10 to 22 carbon atoms), p-alkylstyrene, a hydrophobic chain-transfer agent, and a hydrophobic peroxide. The above hydrophobic substances may be used alone or in a mixture of two or more.

Specific examples of the hydrophobic substance include hexadecane, octadecane, icosane, liquid paraffin, liquid isoparaffin, a paraffin wax, a polyethylene wax, an olive oil, cetyl alcohol, stearyl alcohol, lauryl acrylate, stearyl acrylate, lauryl methacrylate, stearyl methacrylate, polystyrene and poly (meth)acrylate having a number-average molecular weight (Mn) of 500 to 10000, or the like.

The amount of the hydrophobic substance used is preferably 0.1 to 10 parts by mass and is more preferably 1 to 3 parts by mass relative to 100 parts by mass of the total amount of the alkyl (meth)acrylate ester (Aa), the (meth)acrylate ester (Ab) including an aromatic hydrocarbon group, and the crosslinking agent and/or the graft-crossing agent, in order to readily control the particle size of the copolymer (A).

In the production of the rubbery polymer (A) according to the present invention, the following publicly known emulsifiers may be used: carboxylic acid emulsifiers, such as alkali metal salts of oleic acid, palmitic acid, stearic acid, and rosin acid and alkali metal salts of alkenylsuccinic acids; and anionic emulsifiers selected from an alkyl sulfate ester, sodium alkylbenzene sulfonate, sodium alkyl sulfosuccinate, polyoxyethylene nonyl phenyl ether sulfate ester sodium, and the like. The above emulsifiers may be used alone or in combination of two or more.

The amount of the emulsifier used is preferably 0.01 to 3.0 parts by mass and is particularly preferably 0.05 to 2.0 parts by mass relative to 100 parts by mass of the total amount of the alkyl (meth)acrylate ester (Aa), the (meth)acrylate ester (Ab) including an aromatic hydrocarbon group, and the crosslinking agent and/or the graft-crossing agent, in order to readily control the particle size of the copolymer (A).

The initiator is a radical polymerization initiator for radical polymerization of the aforementioned crosslinking agent (I) and (meth)acrylate ester(a) and other vinyl compounds used as necessary. Examples of the initiator include an azo polymerization initiator, a photopolymerization initiator, an inorganic peroxide, an organic peroxide, and a redox initiator that includes an organic peroxide, a transition metal, and a reductant. Among these, an azo polymerization initiator, an inorganic peroxide, an organic peroxide, and a redox initiator, which initiates polymerization upon being heated, are preferable. The above polymerization initiators may be used alone or in combination of two or more.

Examples of the azo polymerization initiator include 2,2'-azobis(4-methoxy-2,4-dimethylvaleronitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 4,4'-azobis(4-cyanovaleric acid), dimethyl 2,2'-azobis(2-methylpropionate), dimethyl 1,1'-azobis(1-cyclohexanecarboxylate), 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[2-(2-imidazolin-2-yl) propane], and 2,2'-azobis(2,4,4-trimethylpentane).

Examples of the inorganic peroxide include potassium persulfate, sodium persulfate, ammonium persulfate, and hydrogen peroxide.

Examples of the organic peroxide include peroxy esters. Specific examples thereof include α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoyl peroxy)hexane, 1-cyclohexyl-1-methylethyl peroxy-2-ethylhexanoate, t-hexyl peroxy 2-hexylhexanoate, t-butyl peroxy 2-hexylhexanoate, t-butyl peroxyisobutyrate, t-hexyl peroxy isopropyl monocarbonate, t-butyl peroxymaleic acid, t-butyl peroxy 3,5,5-trimethylhexanoate, t-butyl peroxylaurate, 2,5-dimethyl-2,5-bis(m-toluoyl peroxy) hexane, t-butyl peroxy isopropyl monocarbonate, t-butyl peroxy 2-ethylhexyl monocarbonate, t-hexyl peroxybenzoate, 2,5-dimethyl-2,5-bis(benzoyl peroxy)hexane, t-butyl peroxyacetate, t-butyl peroxy-m-toluoyl benzoate, t-butyl peroxybenzoate, bis(t-butylperoxy)isophthalate, 1,1-bis(t-hexylperoxy)3,3,5-trimethylcyclohexane, 1,1-bis(t-hexylperoxy)cyclohexane, 1,1-bis(t-butylperoxy)3,3,5-trimethylcyclohexane, 1,1-bis(t-butylperoxy)cyclohexane, 1,1-bis(t-butylperoxy)cyclododecane, 2,2-bis(t-butylperoxy)butane, n-butyl 4,4-bis(t-butylperoxy)valerate, 2,2-bis(4,4-di-t-butylperoxycyclohexyl)propane, α,α'-bis(t-butylperoxide) diisopropylbenzene, dicumyl peroxide, 2,5-dimethyl-2,5-bis(t-butylperoxy)hexane, t-butyl cumyl peroxide, di-t-butyl peroxide, cumene hydroperoxide, diisopropylbenzene hydroperoxide, dilauroyl peroxide, diisononanoyl peroxide, t-butyl hydroperoxide, benzoyl peroxide, lauroyl peroxide, dimethyl bis(t-butylperoxy)-3-hexyne, bis(t-butylperoxy isopropyl)benzene, bis(t-butylperoxy)trimethylcyclohexane, butyl-bis(t-butylperoxy)valerate, t-butyl 2-ethylhexane peroxide, dibenzoyl peroxide, para-menthane hydroperoxide, and t-butyl peroxybenzoate.

The redox initiator preferably includes an organic peroxide, ferrous sulfate, a chelating agent, and a reductant. Examples of such a redox initiator include a redox initiator including cumene hydroperoxide, ferrous sulfate, sodium pyrophosphate, and dextrose; and a redox initiator including t-butyl hydroperoxide, sodium formaldehyde sulfoxylate (Rongalite), ferrous sulfate, and disodium ethylenediaminetetraacetate.

Among the above initiators, an organic peroxide is particularly preferable.

The amount of the initiator used is normally 5 parts by mass or less, is preferably 3 parts by mass or less, and is, for example, 0.001 to 3 parts by mass relative to 100 parts by mass of the total amount of the alkyl (meth)acrylate ester (Aa), the (meth)acrylate ester (Ab) including an aromatic hydrocarbon group, and the crosslinking agent and/or the graft-crossing agent.

The above pre-emulsion preparation step is normally conducted at normal temperature (about 10° C. to 50° C.). The miniemulsion polymerization step is conducted at 40° C. to 100° C. for about 30 to 600 minutes.

The average size of particles of the copolymer (A) according to the present invention which are dispersed in the aqueous dispersion is preferably 0.05 to 0.80 μm, is more preferably 0.10 to 0.60 μm, and is further preferably 0.25 to 0.45 μm in order to enhance the physical properties of a molded article produced by molding the thermoplastic resin composition including the graft copolymer (B).

The method for controlling the average particle size of the copolymer (A) is not limited; for example, the type or amount of the emulsifier used may be adjusted.

The average particle size of the copolymer (A) is the volume-average particle size of the copolymer (A) which is determined by the method described in Examples below.

The degree of swelling of the copolymer (A) according to the present invention is preferably 2 to 15 times and is further preferably 4 to 10 times in order to enhance the impact resistance of the thermoplastic resin composition including the graft copolymer (B).

The degree of swelling of the copolymer (A) is determined by the method described in Examples below.

Graft Copolymer (B)

The graft copolymer (B) is a graft copolymer produced by graft polymerization of a vinyl monomer mixture (m1) that includes at least an alkyl (meth)acrylate ester as an essential component onto the copolymer (A). The vinyl monomer mixture (m1) may be any vinyl monomer mixture that includes at least an alkyl (meth)acrylate ester as an essential component. Alternatively, the vinyl monomer mixture (m1) may be a vinyl monomer mixture that includes an alkyl (meth)acrylate ester, a vinyl cyanide compound, and an aromatic vinyl compound.

The graft copolymer (B) is produced by polymerizing the vinyl monomer mixture (m1), which includes at least an alkyl (meth)acrylate ester as an essential component, in the presence of the copolymer (A).

The alkyl (meth)acrylate ester included in the vinyl monomer mixture (m1) is preferably an alkyl (meth)acrylate ester including an alkyl group having 1 to 20 carbon atoms. The number of the carbon atoms included in the alkyl group is particularly preferably 1 to 10. The above alkyl group may be a linear alkyl group, a branched alkyl group, or a cycloalkyl group and is preferably a linear alkyl group. Examples of the alkyl (meth)acrylate ester include alkyl acrylate esters, such as methyl acrylate, ethyl acrylate, n-propyl acrylate, i-propyl acrylate, n-butyl acrylate, i-butyl acrylate, t-butyl acrylate, amyl acrylate, isoamyl acrylate, octyl acrylate, 2-ethylhexyl acrylate, decyl acrylate, lauryl acrylate, stearyl acrylate, cyclohexyl acrylate, pentyl acrylate, and benzyl acrylate; and alkyl methacrylate esters, such as methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, and benzyl methacrylate. Among these, methyl acrylate, methyl methacrylate, and ethyl methacrylate are preferable, and methyl methacrylate and ethyl methacrylate are more preferable in order to enhance the transparency, impact resistance, and weather resistance of a molded article produced by molding the thermoplastic resin composition including the graft copolymer (B).

The above alkyl (meth)acrylate esters may be used alone or in combination of two or more. For example, it is preferable to use methyl methacrylate in combination with methyl acrylate at a ratio of 1:0.01 to 0.2 (mass ratio) in order to reduce the depolymerization of the graft polymer.

It is particularly preferable that the alkyl (meth)acrylate ester included in the vinyl monomer mixture (m1) have the same structure as the alkyl (meth)acrylate ester included in the vinyl monomer mixture (m2) described below from the viewpoints of the transparency, impact resistance, and weather resistance of the thermoplastic resin composition and a molded article produced by molding the thermoplastic resin composition.

Examples of the vinyl cyanide compound included in the vinyl monomer mixture (m1) include acrylonitrile and methacrylonitrile. Among these, acrylonitrile is preferable in order to enhance the transparency and impact resistance of the molded article.

The above vinyl cyanide compounds may be used alone or in combination of two or more.

Examples of the aromatic vinyl compound included in the vinyl monomer mixture (m1) include styrene, α-methylstyrene, o-, m-, or p-methylstyrene, vinylxylene, p-t-butylstyrene, and ethylstyrene. Among these, styrene is preferable in order to enhance the transparency and impact resistance of the molded article.

The above aromatic vinyl compounds may be used alone or in combination of two or more.

In an embodiment of the present invention, the vinyl monomer mixture (m1) includes the alkyl (meth)acrylate ester. In this case, the content of the alkyl (meth)acrylate ester in the vinyl monomer mixture (m1) is preferably, but not limited to, 60% to 100% by mass in order to enhance the impact resistance and transparency of the thermoplastic resin composition and a molded article produced by molding the thermoplastic resin composition in a balanced manner.

The content of the alkyl (meth)acrylate ester is more preferably 70% to 100% by mass.

In another embodiment of the present invention, the vinyl monomer mixture (m1) includes the alkyl (meth)acrylate ester, the vinyl cyanide compound, and the aromatic vinyl compound. In this case, the content of the alkyl (meth) acrylate ester in the vinyl monomer mixture (m1) is preferably, but not limited to, 10% to 30% by mass in order to enhance the impact resistance and transparency of the thermoplastic resin composition and a molded article produced by molding the thermoplastic resin composition in a balanced manner. Moreover, the content of the vinyl cyanide compound in the vinyl monomer mixture (m1) is preferably, but not limited to, 10% to 30% by mass in order to enhance the impact resistance and transparency of the thermoplastic resin composition and a molded article produced by molding the thermoplastic resin composition in a balanced manner. Furthermore, the content of the aromatic vinyl compound in the vinyl monomer mixture (m1) is preferably, but not limited to, 50% to 70% by mass in order to enhance the impact resistance and transparency of the thermoplastic resin composition and a molded article produced by molding the thermoplastic resin composition in a balanced manner.

The vinyl monomer mixture (m1) may further include a monomer that is other than the above alkyl (meth)acrylate ester and copolymerizable with the above monomer or a monomer that is other than the alkyl (meth)acrylate ester, the vinyl cyanide compound, or the aromatic vinyl compound and copolymerizable with the above monomers.

In the case where the vinyl monomer mixture (m1) including the alkyl (meth)acrylate ester is used, examples of the other monomer include aromatic vinyl compounds, such as styrene, α-methylstyrene, o-, m-, or p-methylstyrene, vinylxylene, p-t-butylstyrene, and ethylstyrene; vinyl cyanide compounds, such as acrylonitrile and methacrylonitrile; N-cycloalkylmaleimides, such as N-methylmaleimide, N-ethylmaleimide, N-n-propylmaleimide, N-i-propylmaleimide, N-n-butylmaleimide, N-i-butylmaleimide, N-tert-butylmaleimide, and N-cyclohexylmaleimide; N-arylmaleimides, such as N-phenylmaleimide, N-alkyl-substituted phenylmaleimide, and N-chlorophenylmaleimide; and maleimide compounds, such as N-aralkylmaleimide. The above monomers may be used alone or in combination of two or more.

In the case where the vinyl monomer mixture (m1) including the alkyl (meth)acrylate ester, the vinyl cyanide compound, and the aromatic vinyl compound is used, examples of the other monomer include N-cycloalkylmaleimides, such as N-methylmaleimide, N-ethylmaleimide, N-n-propylmaleimide, N-i-propylmaleimide, N-n-butylmaleimide, N-i-butylmaleimide, N-tert-butylmaleimide, and N-cyclohexylmaleimide; N-arylmaleimides, such as N-phenylmaleimide, N-alkyl-substituted phenylmaleimide, and N-chlorophenylmaleimide; and maleimide compounds, such as N-aralkylmaleimide. The above monomers may be used alone or in combination of two or more.

The graft copolymer (B) is constituted by the copolymer (A) and the vinyl monomer mixture (m1), which includes at least the alkyl (meth)acrylate ester as an essential component, grafted onto the copolymer (A).

The amounts of the copolymer (A) and the vinyl monomer mixture (m1) used for producing the graft copolymer (B) are preferably 50% to 80% by mass and 20% to 50% by mass, respectively, relative to 100% by mass of the graft copolymer (B) in order to enhance the physical properties of the thermoplastic resin composition including the graft copolymer (B) and a molded article produced by molding the thermoplastic resin composition in a balanced manner.

The graft ratio of the graft copolymer (B) is preferably 25% to 100% in order to enhance the physical properties of the thermoplastic resin composition including the graft copolymer (B) and a molded article produced by molding the thermoplastic resin composition in a balanced manner. The graft ratio of the graft copolymer (B) is measured by the method described in Examples below.

The graft copolymer (B) is produced by a known method, such as bulk polymerization, solution polymerization, bulk suspension polymerization, suspension polymerization, or emulsion polymerization. Emulsion polymerization is preferable in order to enhance the physical properties of the thermoplastic resin composition including the graft copolymer (B) and a molded article produced by molding the thermoplastic resin composition in a balanced manner.

Examples of the emulsification graft polymerization method include a method in which the vinyl monomer mixture (m1) is used in one batch or on a continuous or intermittent basis in the presence of an emulsion of the copolymer (A) to cause radical polymerization.

In the graft polymerization method, a chain transfer agent may be optionally used to control the molecular weight and graft ratio of the graft polymer (B). Furthermore, known inorganic electrolytes and the like may be optionally used to control the viscosity and pH of the latex. In the emulsification graft polymerization method, various emulsifiers and radical initiators may be optionally used as needed.

The types and amounts of the emulsifier and the radical initiator used are not limited. Examples of the emulsifier and the radical initiator are the same as the examples of the emulsifier and the radical initiator which are described in the description of the copolymer (A).

Examples of the method for recovering the graft copolymer (B) from an aqueous dispersion of the graft copolymer (B) include the following:

(1) A method in which the aqueous dispersion of the graft copolymer (B) is charged into hot water containing a coagulant dissolved therein in order to coagulate the graft copolymer (B) in the form of a slurry (wet process).

(2) A method in which the aqueous dispersion of the graft copolymer (B) is sprayed into a heating atmosphere in order to recover the graft copolymer (B) in a semi-direct manner (spray drying).

Examples of the coagulant include inorganic acids, such as sulfuric acid, hydrochloric acid, phosphoric acid, and nitric acid; and metal salts, such as calcium chloride, calcium acetate, and aluminum sulfate. The coagulant is selected in accordance with the type of the emulsifier used for the polymerization reaction. Any type of coagulant may be used in the case where only carboxylic acid soap, such as fatty acid soap or rosin acid soap, is used as an emulsifier. It is necessary to use a metal salt in the case where an emulsifier that exhibits a consistent emulsifying capacity even in an acidic region, such as sodium dodecylbenzenesulfonate, is used.

Examples of the method for obtaining a dried graft copolymer (B) from a slurry of the graft copolymer (B) include the following:

(1) A method in which the slurry is cleaned in order to cause the emulsifier residue that remains in the slurry to elute into water, then dehydrated with a centrifugal or press dehydrator, and subsequently dried with a flash drier or the like.

(2) A method in which dehydration and drying are performed simultaneously with a squeeze dehydrator, an extruder, or the like.

Subsequent to the drying process, the graft copolymer (B) is produced in the form of a powder or particles.

The graft copolymer (B) discharged from the squeeze dehydrator or extruder may be fed directly to an extruder or molding machine used for producing the thermoplastic resin composition.

Copolymer (C)

The copolymer (C) is produced by polymerizing a vinyl monomer mixture (m2) including an alkyl (meth)acrylate ester.

The vinyl monomer mixture (m2) includes a (meth)acrylate ester as an essential component in order to enhance the transparency and weather resistance of the thermoplastic resin composition and a molded article produced by molding the thermoplastic resin composition.

Examples of the alkyl (meth)acrylate ester included in the vinyl monomer mixture (m2) are the same as the above-described examples of the alkyl (meth)acrylate ester included in the vinyl monomer mixture (m1). Among the above-described alkyl (meth)acrylate esters, methyl acrylate, methyl methacrylate, and ethyl methacrylate are preferable, and methyl methacrylate and ethyl methacrylate are more preferable in order to enhance the transparency, impact resistance, and weather resistance of the thermoplastic resin composition and a molded article produced by molding the thermoplastic resin composition.

The above alkyl (meth)acrylate esters may be used alone or in combination of two or more. For example, it is preferable to use methyl methacrylate in combination with methyl acrylate at a ratio of 1:0.01 to 0.2 (mass ratio) in order to reduce the depolymerization of the copolymer (C).

The content of the alkyl (meth)acrylate ester in the vinyl monomer mixture (m2) is preferably 60% to 100% by mass in order to enhance the transparency and weather resistance of the thermoplastic resin composition and a molded article produced by molding the thermoplastic resin composition and is more preferably 70% to 100% by mass.

The vinyl monomer mixture (m2) may optionally further include a monomer that is other than the above alkyl (meth)acrylate ester and copolymerizable with the alkyl (meth)acrylate ester, such that the physical properties of the thermoplastic resin composition and a molded article produced by molding the thermoplastic resin composition are not impaired.

Examples of the other monomer include the above-described examples of the vinyl cyanide compound, the aromatic vinyl compound, and the other monomer included in the vinyl monomer mixture (m1). The other monomers may be used alone or in combination of two or more.

The mass-average molecular weight of the copolymer (C) is preferably, but not limited to, 10,000 to 300,000 and is particularly preferably 50,000 to 200,000. When the mass-average molecular weight of the copolymer (C) falls within the above range, the thermoplastic resin composition has excellent flowability and excellent impact resistance.

The mass-average molecular weight of the copolymer (C) is measured by the method described in Examples below.

The method for producing the copolymer (C) is not limited; examples thereof include known polymerization methods, such as emulsion polymerization, suspension polymerization, bulk polymerization, and solution polymerization. Suspension polymerization and bulk polymerization are preferable from the viewpoint of the heat resistance of the thermoplastic resin composition.

Examples of the polymerization initiator used in the production of the copolymer (C) include, but are not limited to, organic peroxides.

A chain transfer agent may be optionally used to control the molecular weight of the copolymer (C) in the production of the copolymer (C). Examples of the chain transfer agent include, but are not limited to, mercaptans, α-methylstyrene dimer, and terpenes.

Thermoplastic Resin Composition

The thermoplastic resin composition according to the present invention includes the graft copolymer (B) according to the present invention and preferably includes the graft copolymer (B) according to the present invention and the copolymer (C).

The content of the graft polymer (B) according to the present invention in the thermoplastic resin composition according to the present invention is preferably 10% to 50% by mass relative to 100% by mass of the total content of the graft copolymer (B) and the copolymer (C). The content of the copolymer (C) is preferably 50% to 90% by mass. When the contents of the graft polymer (B) and the copolymer (C) fall within the above ranges, the thermoplastic resin composition and a molded article produced by molding the thermoplastic resin composition may have excellent transparency and excellent impact resistance.

The thermoplastic resin composition according to the present invention may optionally include another thermoplastic resin as needed such that the physical properties of the thermoplastic resin composition and a molded article produced by molding the thermoplastic resin composition are not impaired. Examples of the other thermoplastic resin include, but are not limited to, a polycarbonate resin, polybutylene terephthalate (PBT resin), polyethylene terephthalate (PET resin), polyvinyl chloride, polystyrene, a polyacetal resin, modified polyphenylene ether (modified PPE resin), an ethylene-vinyl acetate copolymer, polyarylate, a liquid-crystal polyester resin, a polyethylene resin, a polypropylene resin, a fluororesin, and a polyamide resin (nylon). The above thermoplastic resins may be used alone or in a mixture of two or more.

In the production (mixing) or molding of the thermoplastic resin composition, other common additives, such as a lubricant, a pigment, a dye, a filler (e.g., carbon black, silica, or titanium oxide), a heat-resisting agent, an oxidation degradation inhibitor, a weather-resistant agent, a release agent, a plasticizer, and an antistatic agent, may be optionally added to the thermoplastic resin composition according to the present invention, such that the physical properties of the thermoplastic resin composition and a molded article produced by molding the thermoplastic resin composition are not impaired.

The thermoplastic resin composition according to the present invention may be produced by a known method with a known apparatus. One of the common production methods is melt mixing. Examples of the apparatus used in this method include an extruder, a Banbury mixer, a roller, and a kneader. The mixing process may be performed in either batch or continuous mode.

The order in which the above components are mixed with one another is not limited; the above components may be mixed in any order as long as the all the components are mixed with one another uniformly.

Molded Article

The molded article according to the present invention is produced by molding the thermoplastic resin composition according to the present invention. Examples of the molding method include injection molding, an injection compression molding machine method, an extrusion method, blow molding, vacuum molding, compressed-air molding, calender molding, and inflation molding. Among these, injection molding and injection compression molding are preferable in order to achieve excellent mass productivity and produce a molded article having high dimension accuracy.

Applications

The thermoplastic resin composition according to the present invention has excellent flowability. The molded article produced by molding the thermoplastic resin composition is excellent in terms of transparency, impact resistance, and weather resistance.

The applications of the thermoplastic resin composition according to the present invention and the molded article produced by molding the thermoplastic resin composition are not limited. The thermoplastic resin composition according to the present invention and the molded article produced by molding the thermoplastic resin composition, which are excellent in terms of transparency, impact resistance, weather resistance, and flowability, may be used in a variety of fields, such as OA and household electric appliance, vehicle and shipping, housing-related fields, such as furniture and building materials, sanitary goods, sundries, stationery, toys, and sporting goods.

EXAMPLES

The present invention is described below further specifically with reference to Examples and Comparative examples below. The present invention is not limited to Examples below without departing from the scope of the present invention.

Hereinafter, the expression "part" means "part by mass", and the expression "%" means "% by mass".

Methods for Measuring Physical Properties of Copolymer (A), Graft Copolymer (B), and Copolymer (C)

The methods for measuring the physical properties of the copolymer (A), the graft copolymer (B), and the copolymer (C) used in Examples and Comparative examples below are as follows.

Volume-Average Particle Size of Copolymer (A)

The volume-average particle size of the copolymer (A) dispersed in an aqueous dispersion was measured with MICROTRAC ("NANOTRAC 150" produced by Nikkiso Co., Ltd.) using ion-exchange water as a measurement solvent.

Degree of Swelling of Copolymer (A)

The copolymer (A) was dried at 80° C. for 24 hours and then dried in vacuum at 80° C. for 24 hours. Hereby, a film-like dried copolymer (A) was prepared. Hereinafter, the weight of the dried copolymer (A) is represented by W1. The dried copolymer (A) was immersed in acetone for 12 hours at normal temperature and subsequently filtered through a 200-mesh metal screen. The weight of the residue was measured. Hereinafter, the weight of the residue is represented by W2. Subsequently, the residue was dried in vacuum for 24 hours at normal temperature. The weight of the dried residue measured after vacuum drying is represented by W3. The degree of swelling of the copolymer (A) is calculated using Formula (1) below.

$$\text{Degree of swelling (\%)} = (W2/W3) \times 100 \quad (1)$$

Graft Ratio of Graft Copolymer (B)

To 80 mL of acetone, 1 g of the graft copolymer (B) was added. The resulting mixture was heated to 65° C. to 70° C. for 3 hours to reflux. The resulting suspended acetone solution was subjected to centrifugation at 14,000 rpm for 30 minutes with a centrifugal separation apparatus ("CR21E" produced by Hitachi, Ltd.) in order to separate a precipitate component (component insoluble in acetone) and an acetone solution (component soluble in acetone) from each other.

The precipitation component (component insoluble in acetone) was dried and the mass (Y(g)) of the dried precipitation component was measured. The graft ratio was calculated using Formula (2) below.

In Formula (2), Y is the mass (g) of the component of the graft copolymer (B) which is insoluble in acetone; X is the total mass (g) of the graft copolymer (B) used in the measurement of Y; and the rubber proportion is the concentration of the solid component in the aqueous dispersion of the copolymer (A) which was used in the production of the graft copolymer (B).

$$\text{Graft Ratio (mass \%)} = \{(Y - X \times \text{Rubber proportion})/X \times \text{Rubber proportion}\} \times 100 \quad (2)$$

Mass-Average Molecular Weight of Copolymer (C)

The mass-average molecular weight of the copolymer (C) was measured by gel permeation chromatography (GPC) using a sample prepared by dissolving the copolymer (C) in tetrahydrofuran (THF) in terms of polystyrene (PS) standards.

Methods for Measuring and Evaluating Thermoplastic Resin Composition

The method for measuring the physical properties of the thermoplastic resin compositions prepared in Examples and Comparative examples below, the methods for evaluating the characteristics of the thermoplastic resin compositions, and the molding methods used for the evaluations are as described below.

Measurement of Melt Volume Rate (MVR)

The MVR of the thermoplastic resin composition at 220° C. was measured with a load of 98 N (10 kg) in accordance with ISO 1133:1997. MVR is a measure of the flowability of the thermoplastic resin composition. The higher the MVR value, the higher the degree of flowability.

Injection Molding 1

A pellet of the thermoplastic resin composition produced by melt kneading was molded into a molded article having a length of 80 mm, a width of 10 mm, and a thickness of 4 mm using an injection molding machine ("IS55FP-1.5A" produced by Toshiba Machine Co., Ltd.) at a cylinder temperature of 200° C. to 270° C. and a mold temperature of 60° C. This molded article was used as a molded article for Charpy impact test (molded article (Ma1)).

Injection Molding 2

A pellet of the thermoplastic resin composition produced by melt kneading was molded into a molded article having a length of 100 mm, a width of 100 mm, and a thickness of 3 mm using an injection molding machine ("IS55FP-1.5A" produced by Toshiba Machine Co., Ltd.) at a cylinder temperature of 200° C. to 270° C. and a mold temperature of 60° C. This molded article was used as a molded article for transparency and weather resistance evaluation (molded article (Ma2)).

Transparency Evaluation

The haze (Hz) of the molded article (Ma2) was measured with a haze meter (produced by MURAKAMI COLOR RESEARCH LABORATORY CO., LTD.). The lower the haze, the higher the degree of transparency.

Impact Resistance Evaluation: Charpy Impact Test

The Charpy impact strength (impact direction: edgewise) of the molded article (Ma1) (Type B1, with notch: Shape A single notch) was measured in accordance with ISO 179-1: 2013 at a test temperature of 23° C. The higher the Charpy impact strength, the higher the degree of impact resistance.

Weather Resistance Evaluation

The molded article (Ma2) was treated with Sunshine Weather Meter (produced by Suga Test Instruments Co., Ltd.) at a black panel temperature of 63° C. under a cycle condition of 60 minutes (rainfall: 12 minutes) for 1500 hours. The haze was measured before and after the treatment with a haze meter (produced by MURAKAMI COLOR RESEARCH LABORATORY CO., LTD.), and the change (ΔHz) in haze was determined. The smaller the ΔHz value, the higher the degree of weather resistance.

Production of Copolymer (C)

Production of Copolymer (C-1)

Into a pressure-resistant reaction container, 150 parts of ion-exchange water, a mixture of 99 parts of methyl methacrylate and 1 part of methyl acrylate, which was used as a vinyl monomer mixture (m2), 0.2 parts of 2,2'-azobis(isobutyronitrile), 0.45 parts of n-octyl mercaptan, 0.47 parts of calcium hydroxyapatite, and 0.003 parts of potassium alkenyl succinate were charged. Then, the internal temperature was increased to 75° C., and a reaction was conducted for 3 hours. Subsequently, the temperature was increased to 90° C., and holding was performed for 60 minutes to complete the reaction. The contents were repeatedly cleaned and dehydrated with a centrifugal dehydrator and then dried. Hereby, a copolymer (C-1) having a mass-average molecular weight of 124,000 was prepared.

Examples and Comparative Examples Where Vinyl Monomer Mixture (m1) Including Alkyl (Meth)acrylate Ester was Used Production of Copolymers (A)

Production of Copolymer (A-I-1)

A copolymer (A-I-1) having the following composition was prepared.

Composition n-Butyl acrylate (Aa): 42 parts
2-Phenoxyethyl acrylate (Ab): 18 parts
Allyl methacrylate: 0.24 parts
1,3-Butylene glycol dimethacrylate: 0.12 parts
Liquid paraffin: 0.6 parts
Dipotassium alkenylsuccinate: 0.20 parts
Dilauroyl peroxide: 0.6 parts
Ion-exchange water: 406 parts Into a reaction container equipped with a reagent injection container, a cooling tube, a jacketed heater, and a stirring device, n-butyl acrylate, 2-phenoxyethyl acrylate, liquid paraffin, allyl methacrylate, dilauroyl peroxide, ion-exchange water, and dipotassium alkenylsuccinate were charged. Subsequently, an ultrasound treatment was performed with ULTRASONIC HOMOGENIZER US-600 produced by NIHONSEIKI KAISHA LTD. at an amplitude of 35 μm for 20 minutes at normal temperature to prepare a pre-emulsion. The volume-average particle size of the resulting latex was 250 nm.

The pre-emulsion was heated to 60° C. to initiate radical polymerization. As a result of the polymerization reaction, the liquid temperature was increased to 78° C. The temperature was maintained at 75° C. for 30 minutes to complete the polymerization reaction. Hereby, an aqueous dispersion of a copolymer (A-I-1) having a volume-average particle size of 300 nm was prepared.

Preparation of Copolymers (A-I-2) to (A-I-17)

Aqueous dispersions of copolymers (A-I-2) to (A-I-17) were prepared as in the preparation of the copolymer (A-I-1), except that the amounts of the alkyl (meth)acrylate ester (Aa), the (meth)acrylate ester (Ab) including an aromatic hydrocarbon group, the dipotassium alkenylsuccinate, and the other monomers used were changed as described in Tables 1A and 1B.

Preparation of Copolymer (A-I-18)

Into a stainless steel autoclave (hereinafter, referred to simply as "SUS autoclave"), 145 parts of ion-exchange water (hereinafter, referred to simply as "water"), 1.0 parts of potassium rosinate, 1.0 parts of potassium oleate, 0.06 parts of sodium hydroxide, 0.4 parts of sodium sulfate, and 0.3 parts of t-dodecyl mercaptan were charged. After nitrogen purging had been performed, 125 parts of 1,3-butadiene was charged into the autoclave. Then, the temperature was increased to 60° C.

Subsequently, an aqueous solution prepared by dissolving 0.3 parts of potassium persulfate in 5 parts of water was pressure-injected into the autoclave to initiate polymerization. In the polymerization reaction, the polymerization temperature was adjusted to be 65° C. After a lapse of 12 hours, the unreacted portion of 1,3-butadiene was collected when the internal pressure reached 4.5 kg/cm² (gage pressure). Subsequently, the internal temperature was changed to 80° C. and then holding was performed for 1 hour. Hereby, a butadiene rubber latex having a volume-average particle size of 250 nm and a solid content of 41% was prepared.

Into a 5-liter glass reaction container, 20 parts of the butadiene rubber latex was charged in terms of solid content. Subsequently, 1.0 parts of dipotassium alkenylsuccinate and 150 parts of water were added to the container, which was then purged with nitrogen. Subsequently, the internal temperature was increased to 70° C. To the container, an aqueous solution prepared by dissolving 0.12 parts of potassium persulfate in 10 parts of water was added. Subsequently, a monomer mixture including 79.5 parts of n-butyl acrylate (Aa), 0.33 parts of allyl methacrylate, and 0.17 parts of 1,3-butylene glycol dimethacrylate, which had been purged with nitrogen, was continuously added dropwise to the container over 2 hours. After the completion of the addition of the monomer mixture, the internal temperature was increased to 80° C. and holding was performed for 1 hour. Hereby, an aqueous dispersion of a copolymer (A-I-18) that was constituted by a butadiene rubber and an acrylic rubber and had a volume-average particle size of 300 nm was prepared.

Tables 1A and 1B summarize the degree of swelling and volume-average particle size of each of the copolymers (A-I-1) to (A-I-18).

content) of the copolymer (A-I-1), an aqueous solution containing 0.001 parts of ferrous sulfate, 0.003 parts of a disodium ethylenediaminetetraacetate salt, 0.3 parts of Rongalite, and 5 parts of ion-exchange water was added to the container. Subsequently, an aqueous solution containing 0.65 parts of dipotassium alkenylsuccinate and 10 parts of ion-exchange water was added to the container. Subsequently, a mixture of 39.6 parts of methyl methacrylate and 0.4 parts of methyl acrylate, which was used as a vinyl monomer mixture (m1), and 0.18 parts of t-butyl hydroperoxide were added dropwise to the container over 1 hour 30 minutes to cause graft polymerization.

After the completion of the addition of the mixture, the internal temperature was maintained to be 75° C. for 10 minutes. Subsequently, cooling was performed. When the internal temperature reached 60° C., an aqueous solution prepared by dissolving 0.2 parts of an antioxidant (ANTAGE W500 produced by YOSHITOMI PHARMACEUTICAL INDUSTRIES, LTD.) and 0.2 parts of dipotassium alkenylsuccinate in 5 parts of ion-exchange water was added to the container. The aqueous dispersion obtained as a reaction product was solidified using an aqueous sulfuric acid solution, cleaned with water, and then dried. Hereby, a graft copolymer (B-I-1) was prepared. The graft copolymer (B-I-1) had a graft ratio of 40%.

TABLE 1A

| | Copolymer (A) | A-I-1 | A-I-2 | A-I-3 | A-I-4 | A-I-5 | A-I-6 | A-I-7 | A-I-8 | A-I-9 | A-I-10 |
|---|---|---|---|---|---|---|---|---|---|---|---|
| Raw material composition (part) | n-Butyl acrylate | 42 | 42 | 42 | 44.4 | 40.8 | 39.6 | 36.6 | 33 | 47.4 | 52.2 |
| | 2-Phenoxyethyl acrylate | 18 | 18 | 18 | 15.6 | 19.2 | 20.4 | 23.4 | 27 | 12.6 | 7.8 |
| | Styrene | | | | | | | | | | |
| | Butadiene rubber | | | | | | | | | | |
| | Dipotassium alkenylsuccinate | 0.20 | 1.50 | 0.11 | 0.20 | 0.20 | 0.20 | 0.20 | 0.20 | 0.20 | 0.20 |
| | 1,3-Butylene glycol dimethacrylate | 0.12 | 0.12 | 0.12 | 0.12 | 0.12 | 0.12 | 0.12 | 0.12 | 0.12 | 0.12 |
| | Allyl methacrylate | 0.24 | 0.24 | 0.24 | 0.24 | 0.24 | 0.24 | 0.24 | 0.24 | 0.24 | 0.24 |
| Degree of swelling (time) | | 6.2 | 6.2 | 6.4 | 6.2 | 6.3 | 6.2 | 6.2 | 6.4 | 6.5 | 6.4 |
| Volume-average particle size (nm) | | 300 | 120 | 550 | 300 | 300 | 300 | 300 | 300 | 300 | 300 |
| Remark | | | | | | For Examples | | | | | |

TABLE 1B

| | Copolymer (A) | A-I-11 | A-I-12 | A-I-13 | A-I-14 | A-I-15 | A-I-16 | A-I-17 | A-I-18 |
|---|---|---|---|---|---|---|---|---|---|
| Raw material composition (part) | n-Butyl acrylate | 54 | 30 | 60 | 60 | 60 | 42 | 48 | 48 |
| | 2-Phenoxyethyl acrylate | 6 | 3 | | | | | | |
| | Styrene | | | | | | 18 | 12 | |
| | Butadiene rubber | | | | | | | | 12 |
| | Dipotassium alkenylsuccinate | 0.20 | 0.20 | 0.20 | 1.5 | 0.11 | 0.20 | 0.20 | 0.60 |
| | 1,3-Butylene glycol dimethacrylate | 0.12 | 0.12 | 0.12 | 0.12 | 0.12 | 0.12 | 0.12 | 0.10 |
| | Allyl methacrylate | 0.24 | 0.24 | 0.24 | 0.24 | 0.24 | 0.24 | 0.24 | 0.20 |
| Degree of swelling (time) | | 6.1 | 6.2 | 6.2 | 6.4 | 6.2 | 6.2 | 6.2 | 6.2 |
| Volume-average particle size (nm) | | 300 | 300 | 300 | 120 | 550 | 300 | 300 | 300 |
| Remark | | For Examples | | | For Comparative examples | | | | |

Preparation of Graft Copolymers (B)

Preparation of Graft Copolymer (B-I-1)

After the preparation of the copolymer (A-I-1), while the internal temperature of the reaction container was maintained to be 75° C., relative to 60 parts (in terms of solid Preparation of Graft Copolymers (B-I-2) to (B-I-18)

Graft copolymers (B-I-2) to (B-I-18) were prepared as in the preparation of the graft copolymer (B-I-1), except that the type of the copolymer (A) used was changed as described in Tables 2A and 2B.

Tables 2A and 2B describe the graft ratios of the graft copolymers (B-I-2) to (B-I-18).

TABLE 2A

| Graft copolymer (B) | | B-I-1 | B-I-2 | B-I-3 | B-I-4 | B-I-5 | B-I-6 | B-I-7 | B-I-8 | B-I-9 | B-I-10 |
|---|---|---|---|---|---|---|---|---|---|---|---|
| Copolymer (A) (part) | A-I-1 | 60 | | | | | | | | | |
| | A-I-2 | | 60 | | | | | | | | |
| | A-I-3 | | | 60 | | | | | | | |
| | A-I-4 | | | | 60 | | | | | | |
| | A-I-5 | | | | | 60 | | | | | |
| | A-I-6 | | | | | | 60 | | | | |
| | A-I-7 | | | | | | | 60 | | | |
| | A-I-8 | | | | | | | | 60 | | |
| | A-I-9 | | | | | | | | | 60 | |
| | A-I-10 | | | | | | | | | | 60 |
| Vinyl monomer mixture (m1) (part) | Methyl methacrylate | 39.6 | 39.6 | 39.6 | 39.6 | 39.6 | 39.6 | 39.6 | 39.6 | 39.6 | 39.6 |
| | Methyl acrylate | 0.4 | 0.4 | 0.4 | 0.4 | 0.4 | 0.4 | 0.4 | 0.4 | 0.4 | 0.4 |
| | Graft ratio (%) | 40 | 41 | 40 | 39 | 40 | 39 | 40 | 41 | 40 | 40 |
| | Remark | | | | | Invention example | | | | | |

TABLE 2B

| Graft copolymer (B) | | B-I-11 | B-I-12 | B-I-13 | B-I-14 | B-I-15 | B-I-16 | B-I-17 | B-I-18 |
|---|---|---|---|---|---|---|---|---|---|
| Copolymer (A) (part) | A-I-11 | 60 | | | | | | | |
| | A-I-12 | | 60 | | | | | | |
| | A-I-13 | | | 60 | | | | | |
| | A-I-14 | | | | 60 | | | | |
| | A-I-15 | | | | | 60 | | | |
| | A-I-16 | | | | | | 60 | | |
| | A-I-17 | | | | | | | 60 | |
| | A-I-18 | | | | | | | | 60 |
| Vinyl monomer mixture (m1) (part) | Methyl methacrylate | 39.6 | 39.6 | 39.6 | 39.6 | 39.6 | 39.6 | 39.6 | 39.6 |
| | Methyl acrylate | 0.4 | 0.4 | 0.4 | 0.4 | 0.4 | 0.4 | 0.4 | 0.4 |
| | Graft ratio (%) | 41 | 40 | 40 | 40 | 40 | 40 | 40 | 40 |
| | Remark | Invention example | | | | Comparative example | | | |

Examples I-1 to I-12 and Comparative Examples I-1 to I-6

The components were mixed with each other in the amounts (mass parts) described in Tables 3A and 3B. The resulting mixture was further mixed with 0.8 parts of carbon black. The mixture was then melt-kneaded at 240° C. with a twin-screw extruder ("PCM30" produced by Ikegai Corp) having a vacuum vent with a diameter of 30 mm to form a pellet-like thermoplastic resin composition. The melt volume rate of the thermoplastic resin composition was determined by the above-described method. The transparency, impact resistance, and weather resistance of a molded article prepared by injection-molding of the thermoplastic resin composition were evaluated by the above-described methods.

Tables 3A and 3B describe the evaluation results.

TABLE 3A

| | | Example I-1 | Example I-2 | Example I-3 | Example I-4 | Example I-5 | Example I-6 | Example I-7 | Example I-8 | Example I-9 | Example I-10 | Example I-11 | Example I-12 |
|---|---|---|---|---|---|---|---|---|---|---|---|---|---|
| Graft copolymer (B) (part) | B-I-1 | 28 | | | | | | | | | | | |
| | B-I-2 | | 28 | | | | | | | | | | |
| | B-I-3 | | | 28 | | | | | | | | | |
| | B-I-4 | | | | 28 | | | | | | | | |
| | B-I-5 | | | | | 28 | | | | | | | |
| | B-I-6 | | | | | | 28 | | | | | | |
| | B-I-7 | | | | | | | 28 | | | | | |
| | B-I-8 | | | | | | | | 28 | | | | |
| | B-I-9 | | | | | | | | | 28 | | | |
| | B-I-10 | | | | | | | | | | 28 | | |
| | B-I-11 | | | | | | | | | | | 28 | |
| | B-I-12 | | | | | | | | | | | | 28 |
| Copolymer (C)(part) | C-1 | 72 | 72 | 72 | 72 | 72 | 72 | 72 | 72 | 72 | 72 | 72 | 72 |
| Charpy impact strength at 23° C. (kJ/m$^2$) | | 7.5 | 7.5 | 7.5 | 7.6 | 7.4 | 7.4 | 7.2 | 7 | 7.7 | 7.9 | 7.9 | 6.2 |

TABLE 3A-continued

|  | Example I-1 | Example I-2 | Example I-3 | Example I-4 | Example I-5 | Example I-6 | Example I-7 | Example I-8 | Example I-9 | Example I-10 | Example I-11 | Example I-12 |
|---|---|---|---|---|---|---|---|---|---|---|---|---|
| 220° C. MVR(cm$^3$/10 min) | 8.4 | 8.1 | 8.6 | 8.3 | 8.4 | 8.3 | 8.4 | 9.1 | 8.2 | 8.1 | 8.2 | 8.1 |
| Transparency (Hz) | 1.5 | 1.5 | 1.5 | 1.5 | 1.5 | 1.5 | 4.1 | 8.1 | 4.7 | 9.1 | 12 | 15 |
| Weather resistance (ΔHz) | 1.2 | 0.8 | 0.9 | 0.9 | 1.1 | 0.9 | 0.8 | 1.1 | 0.9 | 0.7 | 1.1 | 0.8 |

TABLE 3B

|  |  | Comparative example I-1 | Comparative example I-2 | Comparative example I-3 | Comparative example I-4 | Comparative example I-5 | Comparative example I-6 |
|---|---|---|---|---|---|---|---|
| Graft copolymer (B) (part) | B-I-13 | 28 |  |  |  |  |  |
|  | B-I-14 |  | 28 |  |  |  |  |
|  | B-I-15 |  |  | 28 |  |  |  |
|  | B-I-16 |  |  |  | 28 |  |  |
|  | B-I-17 |  |  |  |  | 28 |  |
|  | B-I-18 |  |  |  |  |  | 28 |
| Copolymer (C)(part) | C-1 | 72 | 72 | 72 | 72 | 72 | 72 |
| Charpy impact strength at 23° C. (kJ/m$^2$) |  | 7.5 | 2.8 | 6.5 | 2.9 | 3.1 | 7.8 |
| 220° C. MVR(cm$^3$/10 min) |  | 8.4 | 8.0 | 9.1 | 8.2 | 8.2 | 8.1 |
| Transparency (Hz) |  | 95 | 35 | 95 | 15 | 1.8 | 1.5 |
| Weather resistance (ΔHz) |  | 0.9 | 1.0 | 0.9 | 14 | 10 | 25 |

The results obtained in Examples I-1 to I-12 described in Table 3A confirm that, in Examples, a thermoplastic resin composition and a molded article that had excellent impact resistance, excellent flowability, excellent transparency, and excellent weather resistance were prepared.

In contrast, as described in Table 3B, the resin compositions and the molded articles prepared in Comparative examples I-1 to I-6 were significantly poor in terms of any of impact resistance, flowability, transparency, and weather resistance.

Examples and Comparative Examples Where Vinyl Monomer Mixture (m1) Including Alkyl (Meth)acrylate Ester, Vinyl Cyanide Compound, and Aromatic Vinyl Compound Was Used Production of Copolymers (A)

Production of Copolymer (A-II-1)

A copolymer (A-II-1) having the following composition was prepared.

Composition n-Butyl acrylate (Aa): 54 parts
2-Phenoxyethyl acrylate (Ab): 6 parts
Allyl methacrylate: 0.24 parts
1,3-Butylene glycol dimethacrylate: 0.12 parts
Liquid paraffin: 0.6 parts
Dipotassium alkenylsuccinate: 0.20 parts
Dilauroyl peroxide: 0.6 parts
Ion-exchange water: 406 parts Into a reaction container equipped with a reagent injection container, a cooling tube, a jacketed heater, and a stirring device, n-butyl acrylate, 2-phenoxyethyl acrylate, liquid paraffin, allyl methacrylate, dilauroyl peroxide, ion-exchange water, and dipotassium alkenylsuccinate were charged. Subsequently, an ultrasound treatment was performed with ULTRASONIC HOMOGENIZER US-600 produced by NIHONSEIKI KAISHA LTD. at an amplitude of 35 μm for 20 minutes at normal temperature to prepare a pre-emulsion. The volume-average particle size of the resulting latex was 250 nm.

The pre-emulsion was heated to 60° C. to initiate radical polymerization. As a result of the polymerization reaction, the liquid temperature was increased to 78° C. The temperature was maintained at 75° C. for 30 minutes to complete the polymerization reaction. Hereby, an aqueous dispersion of a copolymer (A-II-1) having a volume-average particle size of 300 nm was prepared.

Preparation of Copolymers (A-II-2) to (A-II-15)

Aqueous dispersions of copolymers (A-II-2) to (A-II-15) were prepared as in the preparation of the copolymer (A-II-1), except that the amounts of the alkyl (meth)acrylate ester (Aa), the (meth)acrylate ester (Ab) including an aromatic hydrocarbon group, the dipotassium alkenylsuccinate, and the other monomers used were changed as described in Tables 4A and 4B.

Preparation of Copolymer (A-II-16)

Into a stainless steel autoclave (hereinafter, referred to simply as "SUS autoclave"), 145 parts of ion-exchange water (hereinafter, referred to simply as "water"), 1.0 parts of potassium rosinate, 1.0 parts of potassium oleate, 0.06 parts of sodium hydroxide, 0.4 parts of sodium sulfate, and 0.3 parts of t-dodecyl mercaptan were charged. After nitrogen purging had been performed, 125 parts of 1,3-butadiene was charged into the autoclave. Then, the temperature was increased to 60° C.

Subsequently, an aqueous solution prepared by dissolving 0.3 parts of potassium persulfate in 5 parts of water was pressure-injected into the autoclave to initiate polymerization. In the polymerization reaction, the polymerization temperature was adjusted to be 65° C. After a lapse of 12 hours, the unreacted portion of 1,3-butadiene was collected when the internal pressure reached 4.5 kg/cm$^2$ (gage pressure). Subsequently, the internal temperature was changed to 80° C. and then holding was performed for 1 hour. Hereby, a butadiene rubber latex having a volume-average particle size of 250 nm and a solid content of 41% was prepared.

Into a 5-liter glass reaction container, 20 parts of the butadiene rubber latex was charged in terms of solid content. Subsequently, 1.0 parts of dipotassium alkenylsuccinate and 150 parts of water were added to the container, which was then purged with nitrogen. Subsequently, the internal temperature was increased to 70° C. To the container, an aqueous solution prepared by dissolving 0.12 parts of potassium persulfate in 10 parts of water was added. Subsequently, a monomer mixture including 79.5 parts of n-butyl acrylate (Aa), 0.33 parts of allyl methacrylate, and 0.17 parts of 1,3-butylene glycol dimethacrylate, which had been purged with nitrogen, was continuously added dropwise to the container over 2 hours. After the completion of the addition of the monomer mixture, the internal temperature was increased to 80° C. and holding was performed for 1 hour. Hereby, an aqueous dispersion of a copolymer (A-II-16) that was constituted by a butadiene rubber and an acrylic rubber and had a volume-average particle size of 300 nm was prepared.

Tables 4A and 4B summarize the degree of swelling and volume-average particle size of each of the copolymers (A-II-1) to (A-II-16).

galite, and 5 parts of ion-exchange water was added to the container. Subsequently, an aqueous solution containing 0.65 parts of dipotassium alkenylsuccinate and 10 parts of ion-exchange water was added to the container. Subsequently, a mixture of 8 parts of methyl methacrylate, 8 parts of acrylonitrile, and 24 parts of styrene, which was used as a vinyl monomer mixture (m1), and 0.18 parts of t-butyl hydroperoxide were added dropwise to the container over 1 hour 30 minutes to cause graft polymerization.

After the completion of the addition of the mixture, the internal temperature was maintained to be 75° C. for 10 minutes. Subsequently, cooling was performed. When the internal temperature reached 60° C., an aqueous solution prepared by dissolving 0.2 parts of an antioxidant (ANTAGE W500 produced by YOSHITOMI PHARMACEUTICAL INDUSTRIES, LTD.) and 0.2 parts of dipotassium alkenylsuccinate in 5 parts of ion-exchange water was added to the container. The aqueous dispersion obtained as a reaction product was solidified using an aqueous sulfuric acid solution, cleaned with water, and then dried. Hereby, a graft copolymer (B-II-1) was prepared. The graft copolymer (B-II-1) had a graft ratio of 40%.

TABLE 4A

| | Copolymer (A) | A-II-1 | A-II-2 | A-II-3 | A-II-4 | A-II-5 | A-II-6 | A-II-7 | A-II-8 |
|---|---|---|---|---|---|---|---|---|---|
| Raw material composition (part) | n-Butyl acrylate | 54 | 48 | 48 | 51.6 | 49.2 | 48 | 48 | 48 |
| | 2-Phenoxyethyl acrylate | 6 | 12 | 12 | 8.4 | 10.8 | 12 | 12 | 12 |
| | Styrene | | | | | | | | |
| | Butadiene rubber | | | | | | | | |
| | Dipotassium alkenylsuccinate | 0.20 | 1.50 | 0.11 | 0.20 | 0.20 | 0.20 | 0.20 | 0.20 |
| | 1,3-Butylene glycol dimethacrylate | 0.12 | 0.12 | 0.12 | 0.12 | 0.12 | 0.12 | 0.12 | 0.12 |
| | Allyl methacrylate | 0.24 | 0.24 | 0.24 | 0.24 | 0.24 | 0.24 | 0.24 | 0.24 |
| Degree of swelling (time) | | 6.2 | 6.1 | 6.3 | 6.3 | 6.2 | 6.2 | 6.2 | 6.1 |
| Volume-average particle size (nm) | | 300 | 120 | 550 | 300 | 300 | 300 | 300 | 300 |
| Remark | | | | | For Examples | | | | |

TABLE 4B

| | Copolymer (A) | A-II-9 | A-II-10 | A-II-11 | A-II-12 | A-II-13 | A-II-14 | A-II-15 | A-II-16 |
|---|---|---|---|---|---|---|---|---|---|
| Raw material composition (part) | n-Butyl acrylate | 46.8 | 44.4 | 42 | 55.8 | 39 | 60 | 42 | 48 |
| | 2-Phenoxyethyl acrylate | 13.2 | 15.6 | 18 | 4.2 | 21 | | | |
| | Styrene | | | | | | | 12 | |
| | Butadiene rubber | | | | | | | | 12 |
| | Dipotassium alkenylsuccinate | 0.20 | 0.20 | 0.20 | 0.20 | 0.20 | 0.20 | 0.20 | 0.60 |
| | 1,3-Butylene glycol dimethacrylate | 0.12 | 0.12 | 0.12 | 0.12 | 0.12 | 0.12 | 0.12 | 0.10 |
| | Allyl methacrylate | 0.24 | 0.24 | 0.24 | 0.24 | 0.24 | 0.24 | 0.24 | 0.20 |
| Degree of swelling (time) | | 6.2 | 6.1 | 6.2 | 6.4 | 6.1 | 6.2 | 6.2 | 6.2 |
| Volume-average particle size (nm) | | 300 | 300 | 300 | 300 | 300 | 300 | 300 | 300 |
| Remark | | | | For Examples | | | For Comparative examples | | |

Preparation of Graft Copolymers (B)

Preparation of Graft Copolymer (B-II-1)

After the preparation of the copolymer (A-II-1), while the internal temperature of the reaction container was maintained to be 75° C., relative to 60 parts (in terms of solid content) of the copolymer (A-II-1), an aqueous solution containing 0.001 parts of ferrous sulfate, 0.003 parts of a disodium ethylenediaminetetraacetate salt, 0.3 parts of Ron- Preparation of Graft Copolymers (B-II-2) to (B-II-16)

Graft copolymers (B-II-2) to (B-II-16) were prepared as in the preparation of the graft copolymer (B-II-1), except that the type of the copolymer (A) used was changed as described in Tables 5A and 5B.

Tables 5A and 5B describe the graft ratios of the graft copolymers (B-II-2) to (B-II-16).

TABLE 5A

| Graft copolymer (B) | | B-II-1 | B-II-2 | B-II-3 | B-II-4 | B-II-5 | B-II-6 | B-II-7 | B-II-8 |
|---|---|---|---|---|---|---|---|---|---|
| Copolymer (A) (part) | A-II-1 | 60 | | | | | | | |
| | A-II-2 | | 60 | | | | | | |
| | A-II-3 | | | 60 | | | | | |
| | A-II-4 | | | | 60 | | | | |
| | A-II-5 | | | | | 60 | | | |
| | A-II-6 | | | | | | 60 | | |
| | A-II-7 | | | | | | | 60 | |
| | A-II-8 | | | | | | | | 60 |
| Vinyl monomer mixture (m1) (part) | Methyl methacrylate | 8 | 8 | 8 | 8 | 8 | 8 | 12 | 4 |
| | Acrylonitrile | 8 | 8 | 8 | 8 | 8 | 8 | 8 | 8 |
| | Styrene | 24 | 24 | 24 | 24 | 24 | 24 | 5 | 28 |
| | Graft ratio (%) | 40 | 41 | 40 | 39 | 40 | 39 | 40 | 41 |
| | Remark | | | | Invention example | | | | |

TABLE 5B

| Graft copolymer (B) | | B-II-9 | B-II-10 | B-II-11 | B-II-12 | B-II-13 | B-II-14 | B-II-15 | B-II-16 |
|---|---|---|---|---|---|---|---|---|---|
| Copolymer (A) (part) | A-II-9 | 60 | | | | | | | |
| | A-II-10 | | 60 | | | | | | |
| | A-II-11 | | | 60 | | | | | |
| | A-II-12 | | | | 60 | | | | |
| | A-II-13 | | | | | 60 | | | |
| | A-II-14 | | | | | | 60 | | |
| | A-II-15 | | | | | | | 60 | |
| | A-II-16 | | | | | | | | 60 |
| Vinyl monomer mixture (m1) (part) | Methyl methacrylate | 8 | 8 | 8 | 8 | 8 | 8 | 8 | 8 |
| | Acrylonitrile | 8 | 8 | 8 | 8 | 8 | 8 | 8 | 8 |
| | Styrene | 24 | 24 | 24 | 24 | 24 | 24 | 24 | 24 |
| | Graft ratio (%) | 40 | 40 | 41 | 40 | 40 | 40 | 40 | 40 |
| | Remark | | Invention example | | | | For Comparative examples | | |

Examples II-1 to II-13 and Comparative Examples II-1 to II-3

The components were mixed with each other in the amounts (mass parts) described in Tables 6A and 6B. The resulting mixture was further mixed with 0.8 parts of carbon black. The mixture was then melt-kneaded at 240° C. with a twin-screw extruder ("PCM30" produced by Ikegai Corp) having a vacuum vent with a diameter of 30 mm to form a pellet-like thermoplastic resin composition. The melt volume rate of the thermoplastic resin composition was determined by the above-described method. The transparency, impact resistance, and weather resistance of a molded article prepared by injection-molding of the thermoplastic resin composition were evaluated by the above-described methods.

Tables 6A and 6B describe the evaluation results.

TABLE 6A

| | | Example II-1 | Example II-2 | Example II-3 | Example II-4 | Example II-5 | Example II-6 | Example II-7 | Example II-8 | Example II-9 | Example II-10 | Example II-11 | Example II-12 | Example II-13 |
|---|---|---|---|---|---|---|---|---|---|---|---|---|---|---|
| Graft copolymer (B) (part) | B-II-1 | 28 | | | | | | | | | | | | |
| | B-II-2 | | 28 | | | | | | | | | | | |
| | B-II-3 | | | 28 | | | | | | | | | | |
| | B-II-4 | | | | 28 | | | | | | | | | |
| | B-II-5 | | | | | 28 | | | | | | | | |
| | B-II-6 | | | | | | 28 | | | | | | | |
| | B-II-7 | | | | | | | 28 | | | | | | |
| | B-II-8 | | | | | | | | 28 | | | | | |
| | B-II-9 | | | | | | | | | 28 | | | | |
| | B-II-10 | | | | | | | | | | 28 | | | |
| | B-II-11 | | | | | | | | | | | 28 | | |
| | B-II-12 | | | | | | | | | | | | 28 | |
| | B-II-13 | | | | | | | | | | | | | 28 |
| Copolymer (C) (part) | C-1 | 72 | 72 | 72 | 72 | 72 | 72 | 72 | 72 | 72 | 72 | 72 | 72 | 72 |
| Charpy impact strength at 23° C. (kJ/m$^2$) | | 8.4 | 8.2 | 8.2 | 8.3 | 8.1 | 8.1 | 8.1 | 8.1 | 8.1 | 7.9 | 7.7 | 8.4 | 6.2 |
| 220° C. MVR(cm$^3$/10 min) | | 12.9 | 13.0 | 13.1 | 13.1 | 13.2 | 13.1 | 11.2 | 14.1 | 12.4 | 12.9 | 12.8 | 12.9 | 13.1 |

TABLE 6A-continued

| | Example II-1 | Example II-2 | Example II-3 | Example II-4 | Example II-5 | Example II-6 | Example II-7 | Example II-8 | Example II-9 | Example II-10 | Example II-11 | Example II-12 | Example II-13 |
|---|---|---|---|---|---|---|---|---|---|---|---|---|---|
| Transparency (Hz) | 6.9 | 1.5 | 1.5 | 4.7 | 1.5 | 1.5 | 3.1 | 3.9 | 1.5 | 4.9 | 6.9 | 12 | 13 |
| Weather resistance (ΔHz) | 3.1 | 3.2 | 2.9 | 3.1 | 3.0 | 3.0 | 2.5 | 3.5 | 3.1 | 3.1 | 3.1 | 3.1 | 3.1 |

TABLE 6B

| | | Comparative example II-1 | Comparative example II-2 | Comparative example II-3 |
|---|---|---|---|---|
| Graft copolymer (B) (part) | B-II-14 | 28 | | |
| | B-II-15 | | 28 | |
| | B-II-16 | | | 28 |
| Copolymer (C)(part) | C-1 | 72 | 72 | 72 |
| Charpy impact strength at 23° C. (kJ/m$^2$) | | 8.2 | 3.8 | 7.8 |
| 220° C. MVR(cm$^3$/10 min) | | 13.2 | 12.9 | 12.1 |
| Transparency (Hz) | | 95 | 19 | 35 |
| Weather resistance (ΔHz) | | 3.2 | 10.0 | 28 |

The results obtained in Examples II-1 to II-13 described in Table 6A confirm that, in Examples, a thermoplastic resin composition and a molded article that had excellent impact resistance, excellent flowability, excellent transparency, and excellent weather resistance were prepared.

In contrast, as described in Table 6B, the resin compositions and the molded articles prepared in Comparative examples II-1 to II-3 were significantly poor in terms of any of impact resistance, flowability, transparency, and weather resistance.

Although the present invention has been described in detail with reference to particular embodiments, it is apparent to a person skilled in the art that various modifications can be made therein without departing from the spirit and scope of the present invention.

The present application is based on Japanese Patent Applications Nos. 2018-208252 and 2018-208253 filed on Nov. 5, 2018, which are incorporated herein by reference in their entirety.

The invention claimed is:

1. A graft copolymer (B) produced by graft polymerization of a vinyl monomer mixture (m1) including an alkyl (meth)acrylate ester, a vinyl cyanide compound, and an aromatic vinyl compound onto a copolymer (A), the copolymer (A) being a copolymer of an alkyl (meth)acrylate ester (Aa) and a (meth)acrylate ester (Ab) including an aromatic hydrocarbon group,
wherein, relative to 100% by mass of a total content of a unit of the alkyl (meth)acrylate ester (Aa) and a unit of the (meth)acrylate ester (Ab) including an aromatic hydrocarbon group in the copolymer (A), a content of the unit of the alkyl (meth)acrylate ester (Aa) in the copolymer (A) is 70% to 90% by mass and a content of the unit of the (meth)acrylate ester (Ab) including an aromatic hydrocarbon group in the copolymer (A) is 10% to 30% by mass,
wherein a content of the alkyl (meth)acrylate ester in the vinyl monomer mixture (m1) is 20% to 30% by mass, a content of the vinyl cyanide compound in the vinyl monomer mixture (m1) is 10% to 20% by mass, and a content of the aromatic vinyl compound in the vinyl monomer mixture (m1) is 50% to 60% by mass, and
wherein the copolymer (A) includes a unit of the alkyl (meth)acrylate ester (Aa), a unit of the (meth)acrylate ester (Ab) including an aromatic hydrocarbon group, and a unit derived from a crosslinking agent and/or a unit derived from a graft-crossing agent.

2. The graft copolymer (B) according to claim 1, wherein a content of the unit derived from a crosslinking agent and/or a graft-crossing agent in the copolymer (A) is 0.1% to 3% by mass, relative to 100% by mass of a total content of the unit of the alkyl (meth)acrylate ester (Aa), the unit of the (meth)acrylate ester (Ab) including an aromatic hydrocarbon group, and the unit derived from a crosslinking agent and/or a graft-crossing agent.

3. The graft copolymer (B) according to claim 1, wherein the copolymer (A) is produced by miniemulsion polymerization of a mixture including the alkyl (meth)acrylate ester (Aa), the (meth)acrylate ester (Ab) including an aromatic hydrocarbon group, a crosslinking agent and/or a graft-crossing agent, a hydrophobic substance, and an initiator.

4. The graft copolymer (B) according to claim 1, wherein the copolymer (A) has a volume-average particle size of 0.05 to 0.80 μm and a degree of swelling, measured according to a description, of 2 to 15 times.

5. The graft copolymer (B) according to claim 1, wherein, relative to 100% by mass of a total content of the copolymer (A) and the vinyl monomer mixture (m1), a content of the copolymer (A) is 50% to 80% by mass and a content of the vinyl monomer mixture (m1) is 20% to 50% by mass, and the graft copolymer (B) has a graft ratio, measured according to the description, of 25% to 100%.

6. A thermoplastic resin composition comprising the graft copolymer (B) according to claim 1.

7. The thermoplastic resin composition according to claim 6, further comprising, in addition to the graft copolymer (B), a copolymer (C) that is the product of a polymerization reaction of a vinyl monomer mixture (m2) including an alkyl (meth)acrylate ester.

8. The thermoplastic resin composition according to claim 7, wherein the vinyl monomer mixture (m2) includes an alkyl (meth)acrylate ester having the same structure as the alkyl (meth)acrylate ester included in the vinyl monomer mixture (m1), and a content of the alkyl (meth)acrylate ester in the vinyl monomer mixture (m2) is 60% to 100% by mass.

9. The thermoplastic resin composition according to claim 7, wherein, relative to 100% by mass of a total content of the graft copolymer (B) and the copolymer (C), a content of the graft copolymer (B) is 10% to 50% by mass and a content of the copolymer (C) is 50% to 90% by mass.

10. A molded article produced by molding the thermoplastic resin composition according to claim 6.

* * * * *